US012556973B2

(12) United States Patent
Sakaue et al.

(10) Patent No.: US 12,556,973 B2
(45) Date of Patent: Feb. 17, 2026

(54) CONTROL SYSTEM, CONTROL METHOD, CONTROLLER, AND PROGRAM

(71) Applicant: NTT, Inc., Tokyo (JP)

(72) Inventors: Yuki Sakaue, Musashino (JP); Tomohiro Taniguchi, Musashino (JP); Tatsuya Fukui, Musashino (JP)

(73) Assignee: NTT, Inc., Tokyo (JP)

( * ) Notice: Subject to any disclaimer, the term of this patent is extended or adjusted under 35 U.S.C. 154(b) by 45 days.

(21) Appl. No.: 18/836,069

(22) PCT Filed: Feb. 17, 2022

(86) PCT No.: PCT/JP2022/006375
§ 371 (c)(1),
(2) Date: Aug. 6, 2024

(87) PCT Pub. No.: WO2023/157176
PCT Pub. Date: Aug. 24, 2023

(65) Prior Publication Data
US 2025/0142412 A1 May 1, 2025

(51) Int. Cl.
*H04W 28/10* (2009.01)
(52) U.S. Cl.
CPC ................... *H04W 28/10* (2013.01)
(58) Field of Classification Search
CPC ... H04W 28/10; H04W 8/04; H04W 28/0268; H04W 28/02; H04W 84/12; H04W 28/06;
(Continued)

(56) References Cited

U.S. PATENT DOCUMENTS 6,377,546 B1 * 4/2002 Guerin ............... H04Q 11/0478
370/462
6,961,311 B2 * 11/2005 Rakotoarivelo .... H04W 72/543
370/447

(Continued)

FOREIGN PATENT DOCUMENTS

JP          200049853      2/2000
JP          20076019       1/2007
(Continued)

OTHER PUBLICATIONS

[No Author Listed], "Part 11: Wireless LAN Medium Access Control (MAC) and Physical Layer (PHY) specifications, Amendment 8: Medium Access Control (MAC) Quality of Service Enhancements," IEEE Computer Society, IEEE 802.11e-2005, Nov. 2005, 211 pages.

(Continued)

Primary Examiner — Ninos Donabed
(74) Attorney, Agent, or Firm — Fish & Richardson P.C.

(57) ABSTRACT

An object of the present disclosure is to perform packet transmission control for each buffer according to communication requirements of an application.
In order to achieve the above object, a control system according to the present disclosure is a control system that controls traffic of a wireless network, the control system including: a terminal and an access point that mutually transmit packets accumulated in buffers via the wireless network; and a controller that performs transmission control on the terminal and the access point, in which the controller controls packet transmission between the terminal and the access point for each of the buffers on the basis of amounts of the packets accumulated in the buffers of the terminal and the access point and communication requirements of an application associated with the buffers.

8 Claims, 7 Drawing Sheets

(58) Field of Classification Search
CPC ..... H04W 88/08; H04W 84/18; H04W 76/10; Y02D 30/70
See application file for complete search history.

(56) References Cited

U.S. PATENT DOCUMENTS

| | | | | |
|---|---|---|---|---|
| 7,302,269 | B1* | 11/2007 | Crawford | G01S 5/0289 455/13.2 |
| 7,779,096 | B2* | 8/2010 | Cherkasova | H04N 21/8456 709/225 |
| 8,532,062 | B2* | 9/2013 | Nagasawa | H04W 36/144 370/332 |
| 8,665,824 | B2* | 3/2014 | Nagasawa | H04W 36/02 370/428 |
| 11,632,773 | B2* | 4/2023 | Siraj | H04L 47/6215 370/235 |
| 2004/0125775 | A1* | 7/2004 | Rios | H04W 88/08 370/338 |
| 2010/0080162 | A1* | 4/2010 | Igarashi | H04L 12/1877 370/312 |
| 2010/0189129 | A1* | 7/2010 | Hinosugi | H04L 47/2475 370/468 |
| 2010/0309883 | A1* | 12/2010 | Nagasawa | H04W 36/144 370/331 |
| 2011/0019555 | A1* | 1/2011 | Gotoh | H04W 52/0241 370/252 |
| 2011/0026494 | A1* | 2/2011 | Nagasawa | H04W 36/302 370/332 |
| 2011/0044288 | A1* | 2/2011 | Nagasawa | H04W 36/26 370/331 |
| 2014/0013361 | A1* | 1/2014 | Monari | H04N 21/41415 725/62 |
| 2015/0256427 | A1* | 9/2015 | Kim | H04L 47/2416 370/252 |
| 2020/0008217 | A1* | 1/2020 | Shahar | H04W 28/0278 |
| 2021/0006614 | A1* | 1/2021 | Oyman | H04N 19/30 |
| 2021/0298042 | A1* | 9/2021 | Siraj | H04L 47/24 |
| 2023/0199747 | A1 | 6/2023 | Sakaue et al. | |
| 2023/0403543 | A1* | 12/2023 | Pateromichelakis | H04W 24/02 |

FOREIGN PATENT DOCUMENTS

| | | |
|---|---|---|
| JP | 2010157782 | 7/2010 |
| JP | 2010177797 | 8/2010 |
| WO | WO 2021192323 A1 | 9/2021 |

OTHER PUBLICATIONS

Otani et al., "IEEE802.11e—QoS Enhanced Wireless LAN standard," Journal of the Institute of Image Information and Television Engineers, 2003, 57(11):1459-1464, 13 pages (with English translation).

Sakaue et al., "Proposal of centralized quality control independent of wireless network," IEICE General Conference, online, Mar. 9-12, 2021, 3 pages (with English translation).

* cited by examiner

Fig. 3

| ITEM NUMBER | NODE NUMBER | BUFFER NUMBER | COMMUNICATION REQUIREMENTS | | | PACKET AMOUNT |
| --- | --- | --- | --- | --- | --- | --- |
| | | | BAND | DELAY | JITTER | |
| 1 | ACCESS POINT | 1 | $RB_{01}$ | $RD_{01}$ | $RJ_{01}$ | $B_{01}$ |
| 2 | ACCESS POINT | 2 | $RB_{02}$ | $RD_{02}$ | $RJ_{02}$ | $B_{02}$ |
| ⋮ | ⋮ | ⋮ | ⋮ | ⋮ | ⋮ | ⋮ |
| K | ACCESS POINT | K | $RB_{0K}$ | $RD_{0K}$ | $RJ_{0K}$ | $B_{0K}$ |
| K+1 | TERMINAL #1 | 1 | $RB_{11}$ | $RD_{11}$ | $RJ_{11}$ | $B_{11}$ |
| K+2 | TERMINAL #1 | 2 | $RB_{12}$ | $RD_{12}$ | $RJ_{12}$ | $B_{12}$ |
| ⋮ | ⋮ | ⋮ | ⋮ | ⋮ | ⋮ | ⋮ |
| K+L | TERMINAL #1 | L | $RB_{1L}$ | $RD_{1L}$ | $RJ_{1L}$ | $B_{1L}$ |
| ⋮ | ⋮ | ⋮ | ⋮ | ⋮ | ⋮ | ⋮ |
| K+L+⋯+1 | TERMINAL #N | 1 | $RB_{N1}$ | $RD_{N1}$ | $RJ_{N1}$ | $B_{N1}$ |
| K+L+⋯+2 | TERMINAL #N | 2 | $RB_{N2}$ | $RD_{N2}$ | $RJ_{N2}$ | $B_{N2}$ |
| ⋮ | ⋮ | ⋮ | ⋮ | ⋮ | ⋮ | ⋮ |
| K+L+⋯+M | TERMINAL #N | M | $RB_{NM}$ | $RD_{NM}$ | $RJ_{NM}$ | $B_{NM}$ |

Fig. 5

| ITEM NUMBER | NODE NUMBER | BUFFER NUMBER | COMMUNICATION REQUIREMENTS | | | PACKET AMOUNT |
|---|---|---|---|---|---|---|
| | | | BAND | DELAY | JITTER | |
| 1 | ACCESS POINT | 1 | $RB_{01}$ | $RD_{01}$ | $RJ_{01}$ | $B_{01}$ |
| 2 | ACCESS POINT | 2 | $RB_{02}$ | $RD_{02}$ | $RJ_{02}$ | $B_{02}$ |
| 3 | ACCESS POINT | 3 | $RB_{03}$ | $RD_{03}$ | $RJ_{03}$ | $B_{03}$ |
| 4 | TERMINAL #1 | 1 | $RB_{11}$ | $RD_{11}$ | $RJ_{11}$ | $B_{11}$ |
| 5 | TERMINAL #1 | 2 | $RB_{12}$ | $RD_{12}$ | $RJ_{12}$ | $B_{12}$ |
| 6 | TERMINAL #1 | 3 | $RB_{13}$ | $RD_{13}$ | $RJ_{13}$ | $B_{13}$ |
| 7 | TERMINAL #2 | 1 | $RB_{21}$ | $RD_{21}$ | $RJ_{21}$ | $B_{21}$ |
| 8 | TERMINAL #2 | 2 | $RB_{22}$ | $RD_{22}$ | $RJ_{22}$ | $B_{22}$ |
| 9 | TERMINAL #2 | 3 | $RB_{23}$ | $RD_{23}$ | $RJ_{23}$ | $B_{23}$ |

[5]

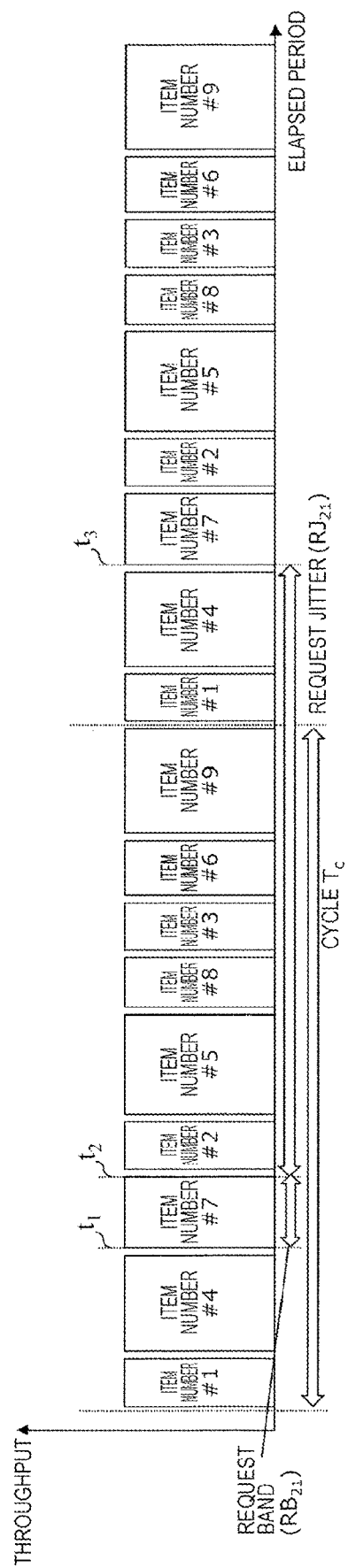

CONTROL SYSTEM, CONTROL METHOD, CONTROLLER, AND PROGRAM

CROSS-REFERENCE TO RELATED APPLICATIONS

This application is a National Stage application under 35 U.S.C. § 371 of International Application No. PCT/JP2022/006375, having an International Filing Date of Feb. 17, 2022.

The disclosure of the prior application is considered part of the disclosure of this application, and is incorporated by reference in its entirety into this application.

TECHNICAL FIELD

The present disclosure relates to a control system, a control method, a controller, and a program for allocating communication bands in an access network.

BACKGROUND ART

In recent years, there have been studies on accommodating a plurality of services and applications having various network requirements on the same network infrastructure. To achieve this, it is necessary to ensure quality required by each service and application accommodated on the same NW in end-to-end sections of "terminal to terminal" or "terminal to application server".

The end-to-end sections of a network can be divided into wireless and wired sections. Among them, in a wireless section, there is a priority control function called enhanced distributed channel access (EDCA) of IEEE 802.11 as an existing technology (Non Patent Literatures 1 and 2).

EDCA is control in units of terminal (destination), and it is difficult to perform packet transmission control in units of traffic flow so as to enable quality control in units of service and application. By applying the technology described in Non Patent Literature 3, it is possible to perform packet transmission control in units of traffic flow and implement quality control in units of service and application.

On the other hand, an application to be used by a device corresponding to a terminal such as a smartphone, a mobile phone, a personal computer, or a robot and a state thereof change from moment to moment, and accordingly, necessary communication requirements also change.

In the technology described in Non Patent Literature 3, there is no function of following fluctuation of the communication requirements as described above. There is therefore a possibility that scheduling not conforming to an actual situation is performed. For example, in a case where a request band is larger than a band provided by scheduling, it causes packet loss, delay, and jitter. In addition, in a case where the request band is smaller than a band provided by scheduling, while packet loss, delay, and jitter do not occur, band utilization efficiency of a wireless network decreases. As described above, a controller needs to grasp change in communication requirements of an application with time change.

CITATION LIST

Non Patent Literature

Non Patent Literature 1: IEEE 802.11e-2005—IEEE Standard for Information technology—Local and metropolitan area networks—Specific requirements—Part 11: Wireless LAN Medium Access Control (MAC) and Physical Layer (PHY) Specifications—Amendment 8: Medium Access Control (MAC) Quality of Service Enhancements Non Patent Literature 2: "QoS wo jitsugen suru musen LAN kikaku IEEE 802.11e (in Japanese) (IEEE802.11e—Wireless LAN Standard for implementing QOS)", The journal of the Institute of Image Information and Television Engineers Vol. 57, No. 11 (2003)

Non Patent Literature 3: "Musen NW ni izon shinai shūchū seigyo ni yoru hinshitsu seigyo gijutsu no teian (in Japanese) (Proposed quality control technology by centralized control not depending on wireless NW)", 2021, The Institute of Electronics, General Conference of Information and Communication Engineers (IEICE) B-6-5 (2021).

SUMMARY OF INVENTION

Technical Problem

In order to solve the above problem, an object of the present disclosure is to perform packet transmission control for each buffer according to communication requirements of an application.

Solution to Problem

In order to achieve the above object, the present disclosure performs packet transmission control on the basis of an amount of packets accumulated in each buffer and communication requirements of an application.

Specifically, a control system according to the present disclosure is a control system for controlling traffic of a wireless network, the control system including: a terminal and an access point that mutually transmit packets accumulated in buffers via the wireless network; and a controller that performs transmission control on the terminal and the access point, in which the controller controls packet transmission between the terminal and the access point for each of the buffers on the basis of amounts of the packets accumulated in the buffers of the terminal and the access point and communication requirements of an application associated with the buffers.

Specifically, a control method according to the present disclosure is a control method for controlling traffic of a wireless network, the control method being
transmission control to be performed by a controller on a terminal and an access point that mutually transmit packets via the wireless network, the control method including controlling packet transmission between the terminal and the access point for each of the buffers on the basis of amounts of packets accumulated in the buffers of the terminal and the access point and communication requirements of an application associated with the buffers.

Specifically, a controller according to the present disclosure is a controller for controlling traffic of a wireless network, the controller being a device that performs transmission control on a terminal and an access point that mutually transmit packets via the wireless network and controlling packet transmission between the terminal and the access point for each of the buffers on the basis of amounts of packets accumulated in the buffers of the terminal and the access point and communication requirements of an application associated with the buffers.

The present disclosure is a program for causing a computer to function as the controller. The controller can also be implemented with a computer and a program, and the program can be recorded on a recording medium or provided through a network.

Advantageous Effects of Invention

According to the present disclosure, it is possible to perform packet transmission control for each buffer according to communication requirements of an application.

BRIEF DESCRIPTION OF DRAWINGS

FIG. 3 is an example of information held in a database included in a controller.

FIG. 5 illustrates an example of a database according to the present disclosure.

FIG. 6 illustrates an example of scheduling according to the present disclosure.

DESCRIPTION OF EMBODIMENTS

Hereinafter, an embodiment of the present disclosure will be described in detail with reference to the drawings. Note that the present disclosure is not limited to the following embodiment. These examples are merely examples, and the present disclosure can be implemented in a form with various modifications and improvements based on the knowledge of those skilled in the art. Note that components having the same reference signs in the present specification and the drawings indicate the same components.

(Basic Configuration)

Figure 1:
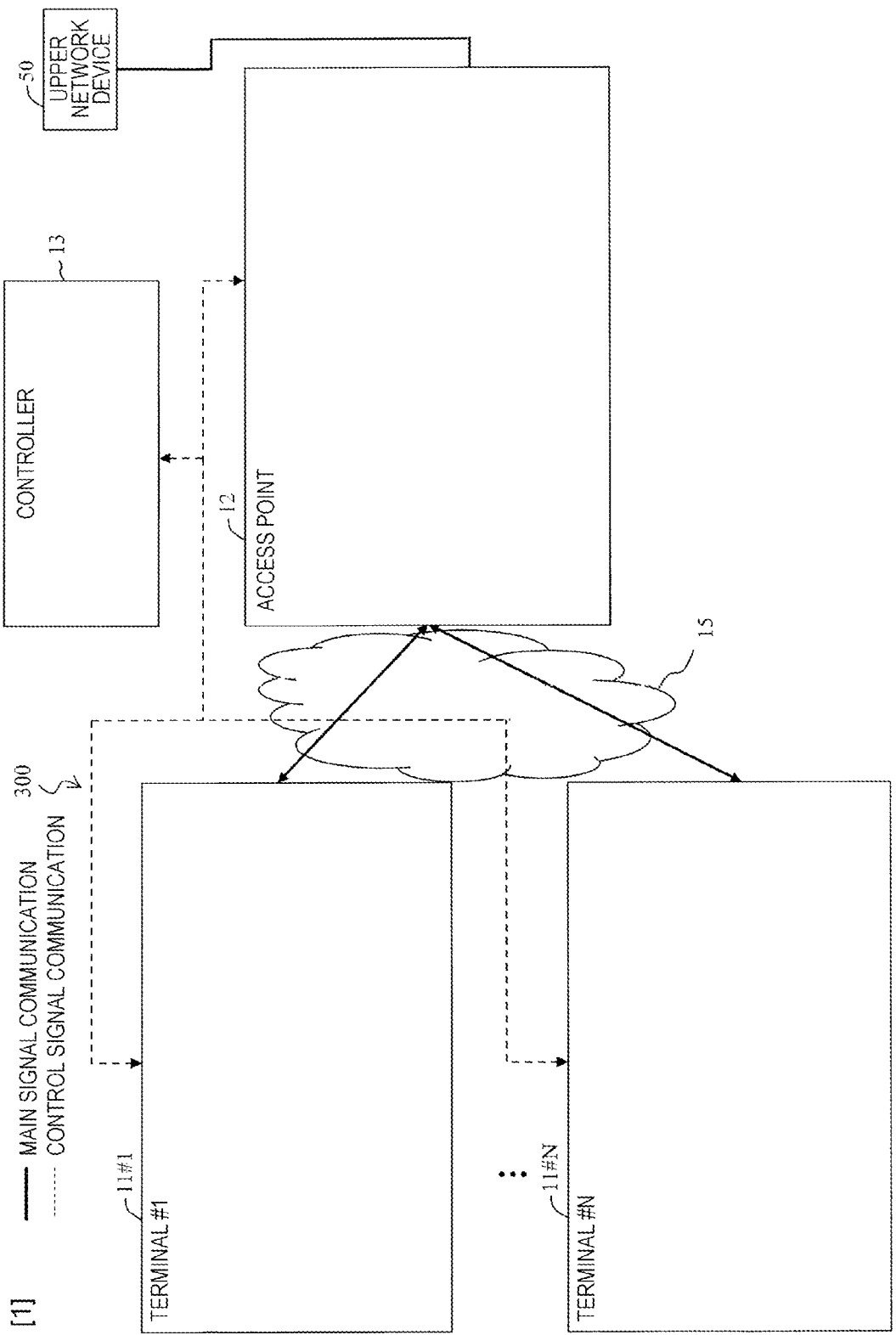
FIG. 1 illustrates an example of a basic configuration of a control system of the present disclosure.

First, a basic configuration of a control system of the present embodiment will be described. FIG. 1 is a view for explaining a control system 300 of the present embodiment.

The control system 300 is a control system that controls traffic of a wireless network 15, and includes:
  a terminal 11 and an access point 12 that mutually transmit packets via the wireless network 15; and
  a controller 13 that performs transmission control on the terminal 11 and the access point 12.
  In the control system 300 of the present disclosure,
  each of the terminals 11 and the access point 12 hold a single or a plurality of flow unit buffer units, which are associated with each application, and
  the controller 13 records buffer numbers of the flow unit buffer units held by each of the terminals 11 and the access point 12 in advance in a database unit in association with communication requirements for each application.

The controller 13 refers to the database unit and controls packet transmission between the terminal 11 and the access point 12 on the basis of amounts of packets accumulated in the flow unit buffer units and the application (AP1) associated with the flow unit buffer units (FB1, FB2) for each flow unit buffer unit of the terminal 11 and the access point 12.

Here, the communication requirements include a request band, a request delay period, and a request delay fluctuation period (request jitter) of an application associated with each of the flow unit buffer unit of the terminal 11 and the flow unit buffer unit of the access point 12. The request band is a communication band in the wireless network 15 necessary for executing the application AP1. In the present embodiment, an example of achieving the request band using a transmission period is described, but the request band in the present disclosure is not limited to a time axis and may be achieved using a wavelength axis. The request delay period is an allowable value of a packet delay period necessary for executing the application AP1. The request jitter is an allowable value of a delay fluctuation period of the packet necessary for executing the application AP1.

In the terminal 11, the application AP1 to be used changes at an arbitrary timing. Thus, in the present disclosure, information on the application associated with the flow unit buffer unit is updated according to the application that is being executed in the terminal 11. This update method is arbitrary, and for example, a notification unit may notify the controller 13 of information on the application associated with the flow unit buffer unit. In addition, the controller 13 may update the communication requirements stored in the database DB3 to new communication requirements by an input signal from the outside. Furthermore, the controller 13 may additionally store new communication requirements in the database DB3 by an input signal from the outside.

First Embodiment

Figure 2:
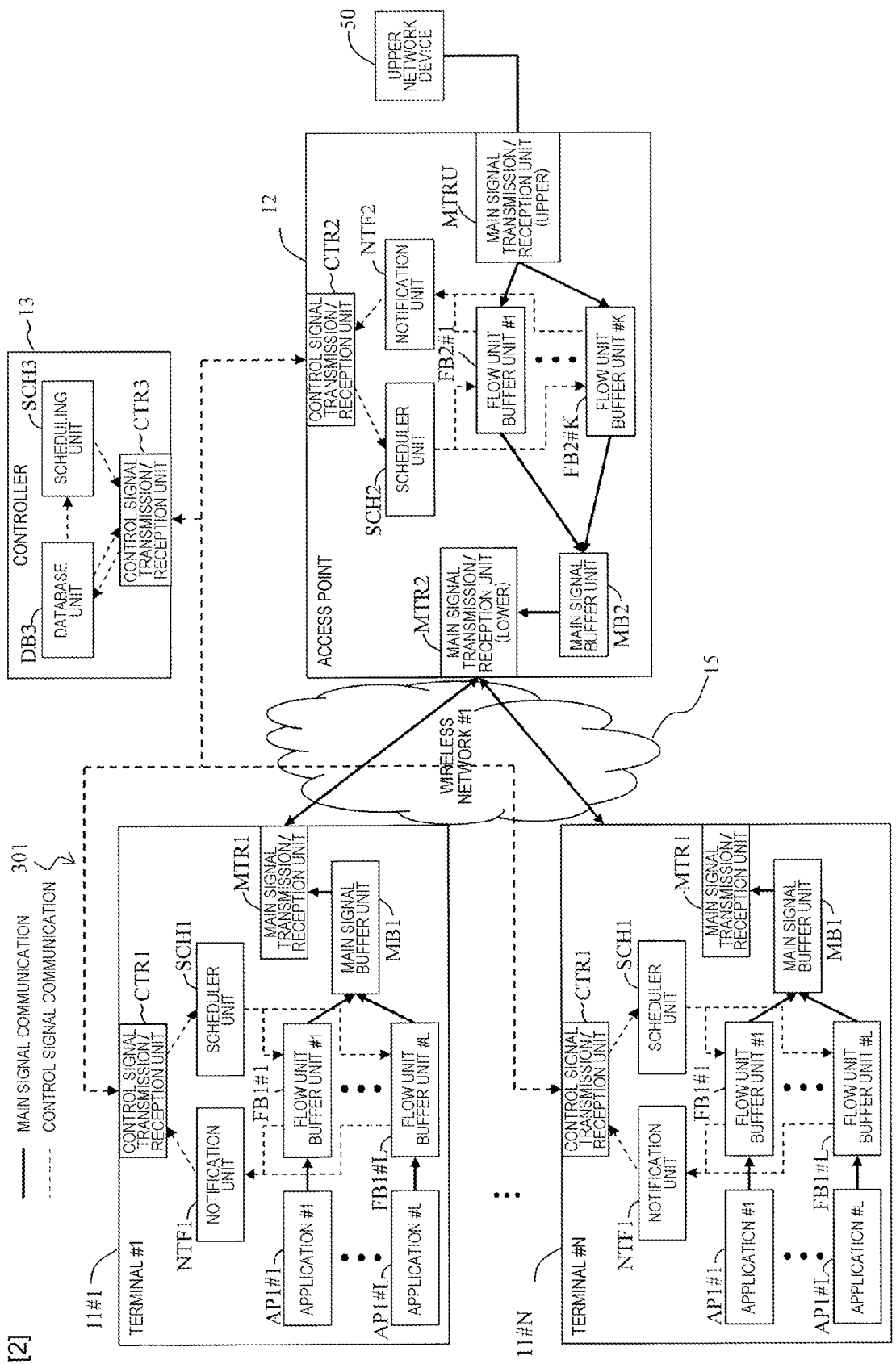
FIG. 2 illustrates an example of a system configuration of the control system of the present disclosure.

FIG. 2 is a view for explaining a control system of the present embodiment. A control system 301 of the present embodiment includes N terminals 11, the access point 12 that communicates with these terminals 11, and the controller 13 that allocates communication bands (hereinafter, "communication bands" will be abbreviated as "bands") of the terminals 11. The terminals 11, the access point 12, and the controller 13 can also be implemented with a computer and a program, and the program can be recorded on a recording medium or provided through a network.

The control system 301 has a function of controlling packet transmission between the terminal 11 and the access point 12 on the basis of notification of amounts of packets from the terminal 11 and the access point 12. Specifically, they have the configurations described below.

The terminal 11 includes a main signal transmission/reception unit MTR1, a main signal buffer unit MB1, flow unit buffer units FB1 #1 to FB1 #L, applications AP1 #1 to AP1 #L, a scheduler unit SCH1, a notification unit NTF1, and a control signal transmission/reception unit CTR1.

The access point 12 includes a main signal transmission/reception unit (lower) MTR2, a main signal buffer unit MB2, flow unit buffer units FB2 #1 to FB2 #K, a main signal transmission/reception unit (upper) MTRU, a notification unit NTF2, a scheduler unit SCH2, and a control signal transmission/reception unit CTR2.

The controller 13 includes a database unit DB3, a scheduling unit SCH3, and a control signal transmission/reception unit CTR3.

Each of the terminal 11 and the access point 12 include:
  a buffer (FB1, FB2) that accumulates transmission packets for each traffic flow;
  a device-side transmission/reception unit (CTR1, CTR2) that transmits an accumulation amount of the transmission packets for each traffic flow accumulated in the buffer (FB1, FB2) to the controller 13 and receives a transmission start timing and a transmission period of the transmission packets for each traffic flow from the controller 13; and a main signal transmission unit (MTR1, MTR2) that transmits the transmission packets for each traffic flow in the buffer (FB1, FB2) to the wireless network 15 in accordance with the transmission start timing and the transmission period.

The controller 13 includes:

the control signal transmission/reception unit CTR3 that receives the accumulation amount from each of the terminal 11 and the access point 12 and transmits the transmission start timing and the transmission period to each of the terminal 11 and the access point 12; and the scheduling unit SCH3 that determines the transmission start timing and the transmission period of the transmission packets for each traffic flow on the basis of communication requirements of the application AP1 of the terminal 11 and the received accumulation amount.

The control system 301 communicates a control signal between the controller 13 and the access point 12/terminal 11 using communication means different from communication means for a main signal (packets of traffic). Specifically, the control signal is transmitted and received between the control signal transmission/reception unit CTR1 of the terminal 11 and the control signal transmission/reception unit CTR3 of the controller 13 and between the control signal transmission/reception unit CTR2 of the access point 12 and the control signal transmission/reception unit CTR3 of the controller 13.

Each of the terminals 11 and the access point 12 periodically notify the controller 13 of the amounts of packets accumulated in the flow unit buffer units (FB1 and FB2) using the control signal.

The terminal 11 accumulates packets transmitted from each application AP1 in the flow unit buffer unit FB1 for each application (for each flow). The notification unit NTF1 periodically checks the amount of accumulated packets of each flow unit buffer unit FB1 and notifies the controller 13 of the amount of packets accumulated in each flow unit buffer unit FB1 using the control signal via the control signal transmission/reception unit CTR1. In the present disclosure, the control signal for notifying the amount of accumulated packets will be referred to as "packet amount notification". The packet amount notification also includes information on the terminal 11 or the access point 12 and information on the flow unit buffer unit (FB1, FB2).

Note that the flow unit buffer unit FB1 may be owned by the application AP1.

In addition, the access point 12 accumulates packets from an upper network device 50 in the flow unit buffer unit FB2 for each application (for each flow). The notification unit NTF2 periodically checks the amount of accumulated packets of each flow unit buffer unit FB2 and notifies the controller 13 of the amount using the control signal via the control signal transmission/reception unit CTR2.

The controller 13 records the notified amount of accumulated packets, information on the terminal 11, the access point 12, and the flow unit buffer unit (FB1 and FB2). Then, the controller 13 determines the transmission start timing and the transmission period for each flow unit buffer unit (FB1, FB2) on the basis of the communication requirements of the application AP1 and the amount of accumulated packets of the terminal 11 and notify each of the terminals 11 and the access point 12 using the control signal.

The control signal transmission/reception unit CTR3 of the controller 13 receives the control signal from each of the terminals 11 and the access point 12 and organizes the amounts of accumulated packets included in the control signals and the information on the terminal 11, the access point 12, and the flow unit buffer units (FB1 and FB2) in the database DB3. In addition, the controller 13 also manages the communication requirements of the application AP1 in the database DB3.

FIG. 3 is a view for explaining an example of information organized in the database DB3.

This database DB3 organizes the following five pieces of information.

The item number is a serial number for all the flow unit buffer units (FB1 and FB2) of the terminal 11 and the access point 12.

The node number is a number of the access point 12 or the terminal 11.

The buffer number is a number of the flow unit buffer unit FB1 possessed by each of the terminals 11 or a number of the flow unit buffer unit FB2 possessed by the access point 12.

The packet amount is the amount of accumulated packets held by the flow unit buffer unit having each buffer number. For example, an item number K+2 is the amount of accumulated packets of the flow unit buffer unit FB1 #2 held by the terminal 11 #1, meaning that the amount thereof is "B12".

The communication requirements are communication requirements of the application AP1 associated with the flow unit buffer unit (FB1, FB2). Note that "band" in the communication requirements of FIG. 3 is an abbreviation of a "request band", "delay" is an abbreviation of a "request delay period", and "jitter" is an abbreviation of "request jitter".

The scheduling unit SCH3 of the controller 13 determines the transmission start timing and the transmission period for each flow unit buffer unit from content of the database unit DB3 using a scheduling scheme to be described later. Then, the scheduling unit SCH3 transmits the determined transmission start timing and transmission period from the control signal transmission/reception unit CTR3 to the terminal 11 and the access point 12 using the control signal.

Each of the terminals 11 and the access point 12 read, from the flow unit buffer units (FB1, FB2), packet amounts corresponding to the notified transmission period at the notified transmission start timing and inputs the packet amounts to the main signal buffer units (MB1, MB2). The main signal transmission/reception units (MTR1, MTR2) transmit packets of the main signal buffer units (MB1, MB2) to the wireless network 15 over the notified transmission period.

Figure 4:
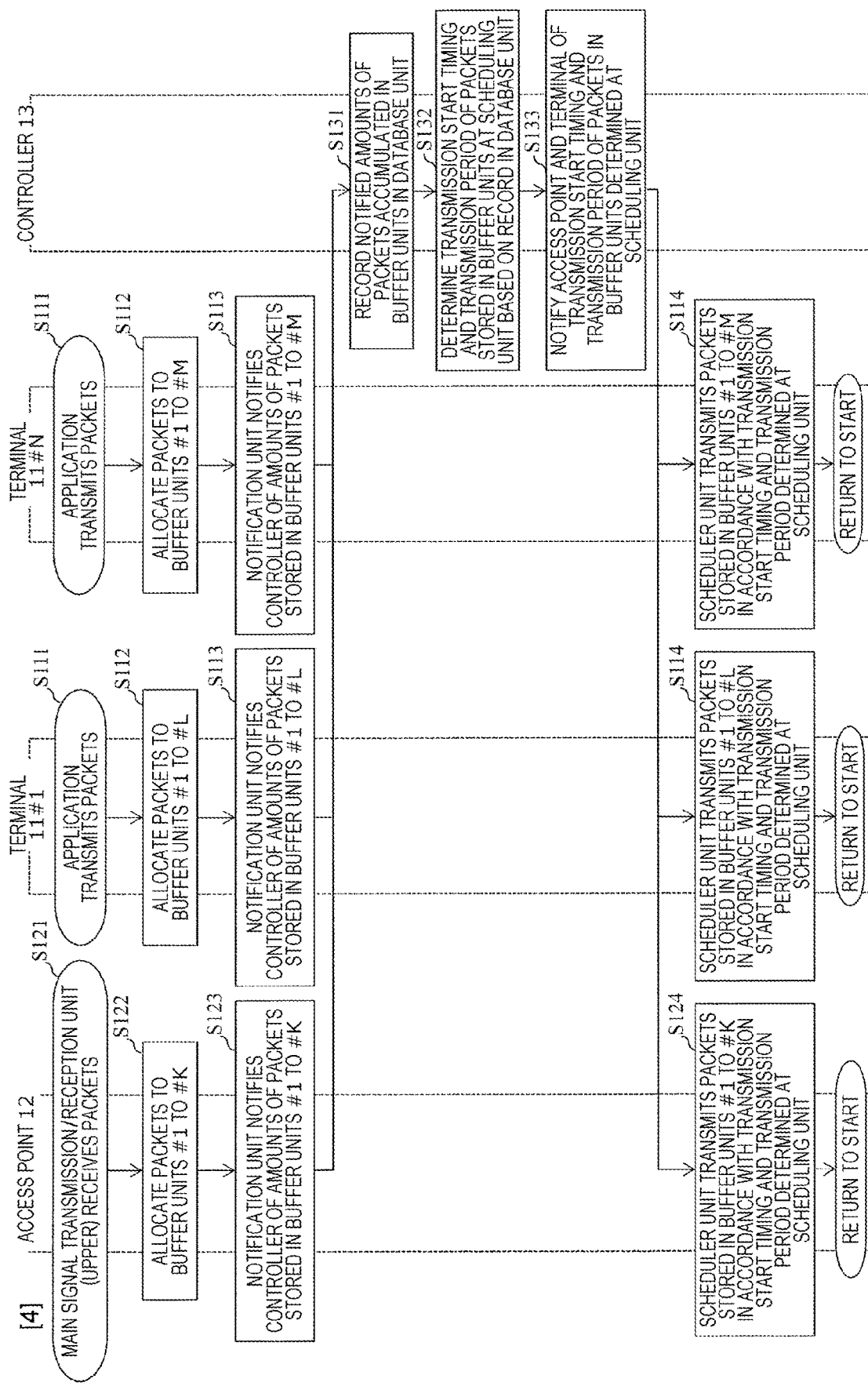
FIG. 4 is a view for explaining a control method according to the present disclosure.

FIG. 4 is a view for explaining operation described above using a flowchart. A control method of the present embodiment is a control method for controlling traffic of the wireless network 15, the control method being transmission control to be performed by the controller 13 on the terminal 11 and the access point 12 that mutually transmit packets via the wireless network 15, the control method including:

accumulating transmission packets in buffers (FB1 and FB2) of the terminal 11 and the access point 12 for each traffic flow (steps S111, S112, S121, and S122);

transmitting amounts of accumulated transmission packets for each traffic flow accumulated in the buffers (FB1 and FB2) to the controller 13 (steps S113 and S123);

determining, by the controller 13, a transmission start timing and a transmission period of transmission packets for each traffic flow on the basis of the amounts of accumulated transmission packets received from each of the terminal 11 and the access point 12 (steps S131 and S132);

transmitting the transmission start timing and the transmission period from the controller 13 to each of the terminal 11 and the access point 12 (step S133); and transmitting transmission packets for each traffic flow from the buffers (FB1 and FB2) of the terminal 11 and the access point 12 to the wireless network 15 in accordance with the transmission start timing and the transmission period (steps S114 and S124).

[Scheduling Scheme]

Here, a scheduling scheme to be performed by the scheduling unit SCH13 of the controller 13 will be described.

An example of scheduling of the control system 301 including two terminals 11 #1 and 11 #2 including the flow unit buffer units FB1 #1 to FB1 #3 and one access point 12 including the flow unit buffer units FB2 #1 to FB2 #3 will be described. Note that throughput on a frequency axis of the wireless network 15 is fixed for easy understanding. It is assumed here that the controller 13 notifies the terminals 11 #1 and 11 #2 and the access point 12 of a scheduler for each cycle $T_c$.

FIG. 5 illustrates the database DB3 of this example. First, the scheduling unit SCH13 determines a minimum transmission period on the basis of the request band of the communication requirements for each of the flow unit buffer units FB1 and FB2. For example, in a case of the item number #7, the request band is $RB_{21}$. In this case, the scheduling unit SCH13 allocates the transmission period corresponding to $RB_{21}$ to the item number #7. In this way, as illustrated in FIG. 6, the transmission period of each item number is allocated. In addition, there may be a flow unit buffer unit FB1 or FB2 that cannot transmit all the accumulated packets with the set throughput and transmission period. In this case, the scheduling unit SCH13 may perform scheduling for the remaining packets in the next scheduling for the flow unit buffer unit FB1 or FB2 that cannot transmit all the accumulated packets. Here, the scheduling unit SCH13 may calculate the remaining packet amount that cannot be transmitted using the throughput, the transmission period, and the packet amount.

In addition, the scheduling unit SCH13 may allocate a transmission period shorter than the transmission period based on the request band, in which the amount of accumulated packets can be transmitted in consideration of the packet amount and the throughput, to each of the flow unit buffer units FB1 and FB2. By allocating the transmission period according to the packet amount, more efficient scheduling can be performed.

Then, the scheduling unit SCH13 determines the transmission start timing of each flow unit buffer unit so that the transmission start timing of the flow unit buffer unit having a shorter request delay period of the communication requirements comes first. For example, it is assumed that a relationship of $RD_{01}<RD_{11}<RD_{21}<RD_{02}<RD_{12}<RD_{22}<RD_{03}<RD_{13}<RD_{23}$ holds for the request delay period of each flow unit buffer unit illustrated in FIG. 5. In this case, as illustrated in FIG. 6, the order of the transmission start timings is item number #1 ($RD_{01}$), item number #4 ($RD_{11}$), item number #7 ($RD_{21}$), item number #2 ($RD_{02}$), item number #5 ($RD_{12}$), item number #8 ($RD_{22}$), item number #3 ($RD_{03}$), item number #6 ($RD_{13}$), and item number #9 ($RD_{23}$).

For each flow unit buffer unit, the scheduling unit SCH13 determines the transmission start timing of each flow unit buffer unit so that a packet transmission interval in the same flow unit buffer unit, that is, a period from a transmission completion timing to the next transmission start timing is equal to or less than the request jitter of the communication requirements. For example, for the flow unit buffer unit of the item number #7 illustrated in FIG. 6, scheduling is performed such that a period from a transmission completion timing $t_2$ to the next transmission start timing $t_3$ is equal to or less than request jitter $RJ_{21}$. The same applies to the flow unit buffer units of other item numbers. Here, in a case where the transmission start timing does not satisfy the request jitter of the communication requirements due to the request delay period of the communication requirements, the scheduling unit SCH13 ignores the request delay period of the communication requirements and determines the transmission start timing so as to satisfy the request jitter of the communication requirements.

The communication requirements of the application may change over time. For example, in a case of video communication, an amount of packets to be communicated increases when change in the video is large, but an amount of packets to be communicated decreases when change in the video is small. In such a case, it is conceivable that the communication requirements change with time even in the same application. Thus, the control system 301 according to the present embodiment may include a monitoring unit that detects change of the communication requirements. The changed communication requirements can be addressed in the following manner.

For example, the application AP1 of the terminal 11 may function as a monitoring unit. In this case, in a case where the communication requirements of the application 11 have been changed, the application may notify the controller 13 of the changed communication requirements through the notification unit NTF1.

There is an application manager that controls and monitors the application depending on the application, and thus, the application manager may function as the monitoring unit. In this case, the application manager may detect change of the communication requirements of the application, and the application manager may directly notify the controller 13 of the changed communication requirements.

In the terminal 11 such as a robot, there is a terminal whose state change can be objectively known. Thus, the terminal 11 may include various sensors such as an acceleration sensor and a thermo sensor, a camera, or the like, as the monitoring unit in order to objectively detect a state change. The terminal 11 indirectly confirms its own state change from these various sensors or cameras and notifies the controller 13 of the communication requirements changed by the state change.

Traffic can be monitored in a wireless network. Thus, the control system may further include a network monitoring unit as the monitoring unit. The network monitoring unit checks change in traffic and notifies the controller 13 of the changed communication requirements. Specific examples of change in traffic include throughput, a delay period, jitter, packet loss, and the like. Here, it is estimated that an application, or the like, has been changed in accordance with change in traffic, and the controller 13 is notified of the communication requirements that have been changed to conform to the estimated application, or the like.

In a case where the controller 13 is notified from the monitoring unit, the controller 13 updates the communication requirements stored in the database to the notified communication requirements. An example of updating the communication requirements will be described with reference to FIG. 5. For example, a case is assumed where an amount of packets transmitted by the application AP1 #1 associated with the flow unit buffer unit FB1 #1 of the terminal 11 #1 described in the item number 4 rapidly increases. Then, it is assumed that the request band of the application AP1 #1 has been changed from $RB_{11}$ to $RB'_{11}$ accordingly. In this case, the controller 13 receives a notification indicating that the request band of the item number 4 has been changed from $RB_{11}$ to $RB'_{11}$ from the terminal 11 #1 and updates the request band of the item number 4 of the database DB3 from $RB_{11}$ to $RB'_{11}$.

Figure 7:
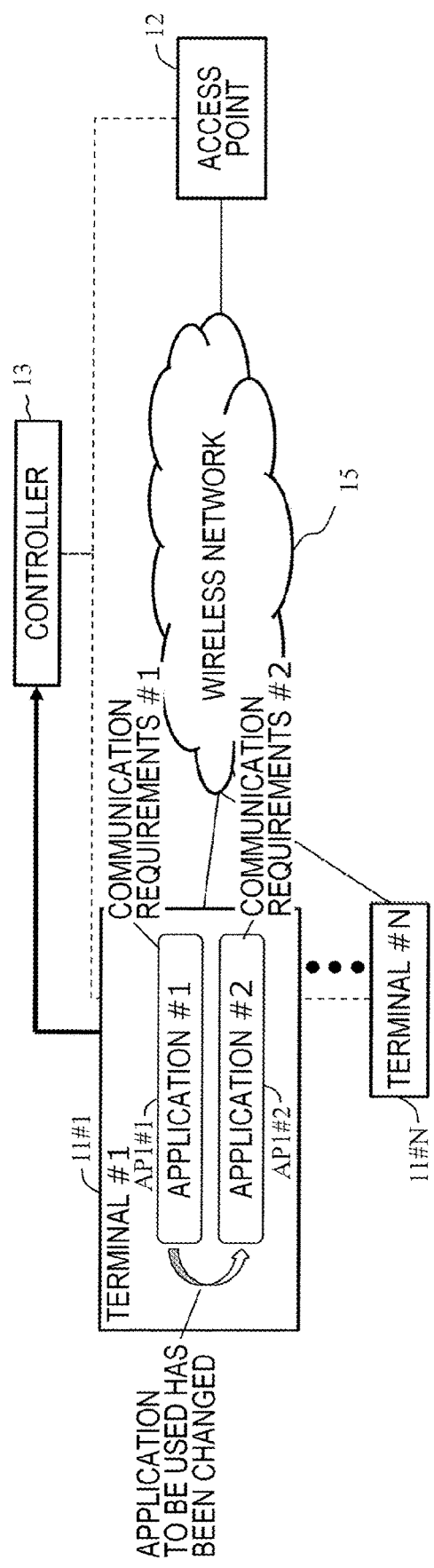
FIG. 7 is a view for explaining effects of the present disclosure.

In the control system in related art, the controller 13 performs scheduling only on the basis of amounts of packets accumulated in the flow unit buffer units of the terminal 11 and the access point 12. Thus, in the control system in related art, in a case where the communication requirements have been changed, scheduling cannot be performed according to the changed communication requirements. However, in the present disclosure, the controller 13 manages the communication requirements of the application in association with the flow unit buffer unit, so that scheduling can be performed in consideration of the communication requirements. Thus, as illustrated in FIG. 7, even in a case where the application to be used by the terminal 11 #1 has been changed from the application AP1 to the application AP2 and the communication requirements have been changed from the communication requirements #1 to the communication requirements #2, scheduling can be performed so as to satisfy the communication requirements #2.

As described above, according to the present disclosure, packet transmission control can be performed for each buffer according to communication requirements of an application.

INDUSTRIAL APPLICABILITY

The present disclosure can be applied to an information communication industry.

REFERENCE SIGNS LIST

11 Terminal
12 Access point
13 Controller
15 Wireless network
50 Upper network device
300, 301 Control system

The invention claimed is:

1. A control system for controlling traffic of a wireless network, the control system comprising:
   a terminal and an access point configured to mutually transmit packets accumulated in buffers via the wireless network; and
   a controller, including one or more processors, configured to perform transmission control on the terminal and the access point,
   wherein the controller is configured to control packet transmission between the terminal and the access point for each of the buffers on a basis of amounts of the packets accumulated in the buffers of the terminal and the access point and communication requirements of an application associated with the buffers, wherein the communication requirements include a request band, a request delay period, and a request jitter of the application, the request jitter indicating an allowable value of a delay fluctuation period of packets necessary for executing the application,
   the controller is further configured to allocate the request band to each of the buffers in an ascending order of the request delay period, and perform scheduling so that a transmission interval of the packets accumulated in the buffers associated with the same application becomes equal to or less than the request jitter.

2. The control system according to claim 1,
   wherein the terminal is configured to notify the controller of changed communication requirements in a case where there is change in the communication requirements of the application, and
   the controller is configured to update, for each of the buffers of the terminal and the access point, a database storing the amounts of the packets accumulated in the buffers and the communication requirements of the application associated with the buffers to the communication requirements notified from the terminal.

3. The control system according to claim 1, further comprising:
   a network monitoring unit, including one or more processors, configured to monitor traffic of the wireless network, estimate change in the communication requirements of the application from the change in the traffic in a case where there is change in the traffic and notify the controller of the changed communication requirements,
   wherein the controller is configured to update, for each of the buffers of the terminal and the access point, a database storing the amounts of the packets accumulated in the buffers and the communication requirements of the application associated with the buffers to the communication requirements notified from the network monitoring unit.

4. A control method for controlling traffic of a wireless network,
   the control method being transmission control to be performed by a controller on a terminal and an access point that mutually transmit packets via the wireless network,
   the control method comprising:
   controlling packet transmission between the terminal and the access point for each of buffers on a basis of amounts of packets accumulated in the buffers of the terminal and the access point and communication requirements of an application associated with the buffers, wherein the communication requirements include a request band, a request delay period, and a request jitter of the application, the request jitter indicating an allowable value of a delay fluctuation period of packets necessary for executing the application,
   the control method further comprising:
   allocating the request band to each of the buffers in an ascending order of the request delay period; and
   performing scheduling so that a transmission interval of the packets accumulated in the buffers associated with the same application becomes equal to or less than the request jitter.

5. A controller for controlling traffic of a wireless network,
   the controller being a device including one or more processors is configured to perform transmission control on a terminal and an access point that mutually transmit packets via the wireless network, and
   control packet transmission between the terminal and the access point for each of buffers on a basis of amounts of packets accumulated in the buffers of the terminal and the access point and communication requirements of an application associated with the buffers, wherein the communication requirements include a request band, a request delay period, and a request jitter of the application, the request jitter indicating an allowable value of a delay fluctuation period of packets necessary for executing the application, the controller is further configured to allocate the request band to each of the buffers in an ascending order of the request delay period, and perform scheduling so that a transmission interval of the packets accumulated in the buffers associated with the same application becomes equal to or less than the request jitter.

6. A non-transitory computer-readable storage medium storing a program for causing a computer to serve as the controller according to claim 5.

7. The control method according to claim 4, wherein the terminal is configured to notify the controller of changed communication requirements in a case where there is change in the communication requirements of the application, and the controller method further comprises updating, for each of the buffers of the terminal and the access point, a database storing the amounts of the packets accumulated in the buffers and the communication requirements of the application associated with the buffers to the communication requirements notified from the terminal.

8. The control method according to claim 4, further comprising:

monitoring traffic of the wireless network, estimating change in the communication requirements of the application from the change in the traffic in a case where there is change in the traffic and notifying the controller of the changed communication requirements, updating, for each of the buffers of the terminal and the access point, a database storing the amounts of the packets accumulated in the buffers and the communication requirements of the application associated with the buffers to the communication requirements notified from a network monitoring unit.

* * * * *